United States Patent [19]
Brock et al.

[11] Patent Number: 5,572,269
[45] Date of Patent: Nov. 5, 1996

[54] MAGNETIC HEAD TRANSLATION SYSTEM FOR RECORDING AND REPRODUCING ON MAGNETIC-ON-FILM LAYER

[75] Inventors: George W. Brock, La Jolla; Robert E. Swanson, Del Mar; Sheldon W. Hower, San Diego, all of Calif.

[73] Assignee: Eastman Kodak Company, Rochester, N.Y.

[21] Appl. No.: 437,204

[22] Filed: May 8, 1995

[51] Int. Cl.$^6$ ............................ G03B 17/24; G03B 29/00
[52] U.S. Cl. ............................ 396/320; 396/319
[58] Field of Search ............................ 354/106, 76, 105, 354/21; 352/228; 360/83, 101, 106, 107, 78.01

[56] References Cited

U.S. PATENT DOCUMENTS

| | | | |
|---|---|---|---|
| 2,926,920 | 3/1960 | Lorenz | 274/4 |
| 3,471,654 | 10/1969 | Dollenmayer | 179/100.2 |
| 3,559,999 | 2/1971 | Perkins | 274/4 |
| 3,583,709 | 6/1971 | Dollenmayer | 274/4 |
| 3,818,505 | 6/1974 | Garrett | 360/101 |
| 4,275,427 | 6/1981 | Bjordahl | 360/106 |
| 4,394,696 | 7/1983 | Yoshimaru | 360/78 |
| 4,655,566 | 4/1987 | Heiniger | 352/225 |
| 4,833,558 | 5/1989 | Bahari | 360/106 |
| 4,977,419 | 12/1990 | Wash et al. | 354/76 |
| 5,016,030 | 5/1991 | Dwyer et al. | 354/21 |
| 5,023,635 | 6/1991 | Nealor | 354/76 |
| 5,034,836 | 7/1991 | DeMarti, Jr. et al. | 360/104 |
| 5,307,100 | 4/1994 | Kubo | 354/105 |
| 5,336,589 | 8/1994 | Munkunoki et al. | 430/501 |

*Primary Examiner*—Michael L. Gellner
*Assistant Examiner*—John Chizmar
*Attorney, Agent, or Firm*—William F. Noval

[57] ABSTRACT

A magnetic recording and/or reproducing head system particularly for use for writing and/or reading information on tracks in a magnetics-on-film (MOF) layer in the image area of photographic filmstrips, wherein the system provides for mounting of such magnetic heads on a suspension and translation system to move the magnetic heads from track to track of the MOF layer and longitudinally along a selected track. The filmstrip exhibits a lengthwise curvature of a predetermined sign and a cross-film curvature. The filmstrip is advanced to a stationary position in a curved transport path in the length dimension of the filmstrip, the curved transport path having a curvature radius of the same sign as the predetermined curvature sign of the filmstrip. The filmstrip edges are engaged in edge guides such that the transport path curvature and the edge guides negate cross-film curvature. The magnetic head is lengthwise translated along the selected track following the curvature radius on a head track selection assembly which includes a head track guide connected between first ends of a pair of positioning arms extending across the film edge guides for supporting the magnetic head for engagement and lengthwise translation with the filmstrip selected track by pivotal movement thereof. A head track motor drives the magnetic head along a head track selection assembly to a selected track position. The head track selection assembly includes a guide rod and a rotatable lead screw extending between free ends of the positioning arms and across the film transport path. Head mounting means for mounting the magnetic head in relation to the film transport path have a guide opening for engaging the guide rod for inhibiting rotation of the head mounting means about the lead screw on rotation of the lead screw and have a threaded bore for engaging the lead screw, whereby rotation of the lead screw effects translation of the head mounting means along the lead screw and guide rod and across the film transport path to a selected track.

10 Claims, 7 Drawing Sheets

MAGNETIC HEAD TRANSLATION SYSTEM FOR RECORDING AND REPRODUCING ON MAGNETIC-ON-FILM LAYER

CROSS-REFERENCE TO RELATED APPLICATIONS

Reference is hereby made to commonly assigned, co-pending U.S. patent application Ser. No. 200,175 filed Feb. 22, 1994, by J. David Cocca and entitled PHOTOGRAPHIC CAMERA AND METHOD OF RECORDING MAGNETIC DATA ON FILM and Ser. No. 333,532 filed Nov. 2, 1994, by W. Stanley Czarnecki et al. and entitled MAGNETICS-ON-FILM IMAGE AREA RECORDING HEAD AND INTERFACE.

FIELD OF THE INVENTION

The present invention relates to magnetic recording and/or reproducing head (for simplicity, referred to herein as magnetic heads) systems particularly for use for writing and/or reading information on a magnetics-on-film (MOF) layer in the image area of photographic filmstrips, and particularly to an assembly for mounting such magnetic heads on a suspension and translation system to move the magnetic heads from track to track of the MOF layer and longitudinally along a selected track.

BACKGROUND OF THE INVENTION

In commonly assigned U.S. Pat. No. 4,977,419, a photographic filmstrip having a virtually transparent, magnetic film layer on the non-emulsion side of the filmstrip (referred to as an MOF layer) is disclosed for use in camera systems. One or more longitudinal read/write tracks are illustrated in the MOF layer between the side edges of the image frame area and the filmstrip where information such as film type, film speed, film exposure information and information relevant to the processing and subsequent use (e.g., printing) of the exposed image frames is pre-recorded during manufacture of the filmstrip cartridge. The pre-recorded information useful for controlling camera operations may be read out in a camera, and information related to the exposure of an image frame may be recorded in certain other tracks during camera use. The information recorded during camera use may include voiced messages or sound associated with the photographed scene and may be recorded in digital or analog format on the certain tracks. It is contemplated that both the pre-recorded and the camera use recorded information will be read out for control and reprint purposes during photofinishing. Also, it is contemplated that the photofinisher may have the capability to record additional information related to finishing, e.g. printing exposure conditions, customer information, reorder information, etc., in further tracks.

Referring now to FIG. 1, the MOF layers on a film strip 10 in which such information may be recorded and from which pre-recorded information may be read out are depicted. The magnetically coated color negative 35 mm film strip 10 includes a base 11, various well-known photochemical emulsion layers 13 on one side of the base 11 and a virtually transparent MOF layer 15 on the other side. An anti-static and lubricating layer 17 overlies the MOF layer 15. The film strip 10 includes a single perforation 19 along at least one film edge at regular intervals matching the pitch of a metering pawl in a camera adapted to use the film strip 10.

For purposes of recording data in the magnetic layer 15, each three of the film strip 10 may be formatted as shown in FIG. 1 (as more fully described in the '419 patent, the disclosure of which is incorporated herein by reference). The frame area is divided into a plurality of predetermined longitudinal track locations designated in the drawing as outermost tracks C0–C3 and innermost tracks F00–F29. As described more fully in the '419 patent, certain of the tracks may be reserved for recording of information in the camera using magnetic recording means included in the camera. In addition, other tracks may be reserved tier use by the photofinisher, and certain of the tracks may be used for recording of audio information.

In filmstrip 10, first edge tracks C0 and C1 are formed in imperforate edge region 10a and second edge tracks C2 and C3 are formed in perforate edge region 10b. In order to accommodate the presence of the camera tracks C2 and C3 along the edge region 10b, the perforations 19 are spaced to be adjacent the borders of successive image frames. In the embodiment of FIG. 1, there is only one perforation 19 in each frame border along only the edge region 10b. However, it will be understood that two perforations adjacent the beginning and the end of each image frame may be provided in edge region 10b as described in the above-referenced '175 application.

The camera and photo finishing systems that have been proposed for recording and reading to or from the tracks F00–F29 employ elongated arrays of a multitude of magnetic heads, e.g. the array disclosed in the above-referenced '532 application. Moreover, a variety of magnetic head suspension and/or backing plate configurations have been proposed to ensure compliance with the MOF layer 15 while avoiding the scratching of the emulsion layers 13.

The photographic filmstrip 10 is of much greater thickness than the magnetic tape used for commercial and consumer recording and reproduction and is neither compliant nor inherently flat. When removed from its cartridge, such a filmstrip shows a relatively high stiffness and very observable cross-film curvature across its width that is convex on or toward the emulsion side of the filmstrip as shown in the illustration of FIG. 2. Further, the unwrapped filmstrip also shows a convex curvature along its length, again on the emulsion side of the film. This latter curvature is attributed primarily to a core-set curl that results from the filmstrip having been tightly wound on a film cartridge spool.

The cross-curvature or curl across the width of the filmstrip 10 is primarily caused by the number of emulsion layers 13 and the MOF layer 15. The emulsion and MOF layers have different stretch properties than that of the base film substrate of acetate, PET, or PEN material. The cross-film curvature is also influenced by the bending phenomena known as anticlastic curvature. The degree of cross-film curvature also depends on environmental conditions, including the time and temperature history of the film, the relative humidity, and the thickness of the film. The cross-film curvature that occurs in the film 10 can also result in "ears" formed at the edges of the film as it curls further inward as shown at 20 and 22.

In the photographic filmstrip 10 bearing the MOF layer 15 described above, the density of the virtually transparent MOF layer is much lower than in magnetic tape. Because of the low magnetic density of the MOF layer 15 and the susceptibility of the emulsion layers 13 to scratching and damage, it is of particular importance that the magnetic head-to-film interface must have high compliance and avoid scratching the MOF layer 15 or the emulsion layers 13. As a result, extreme care must be taken in the design of the components of the interface to ensure that a minimum of surface damage occurs at the magnetic head interface with MOF layer 15 and any load supporting member on the emulsion layer 13.

Because of the cross-film curl, it is difficult to achieve good contact or compliance across the width of a wide, multi-head array. To provide a reliable read or write signal, the length of the magnetic head gap must remain in close proximity to the magnetic coating. Any disturbances, such as variations in cross film curl, can vary the relationship of the magnetic head gap to the magnetic coating and decrease the reliability of the signal. Consequently, to provide high quality and reliability required for camera usage, such head arrays are relatively expensive.

Problems to be Solved by the Invention

While recording a wide variety of data types in the tracks F00–F29 in cameras or in photofinishing operations has been proposed, the user may still have a need to record or read personalized information to or from the tracks. After the filmstrip is processed, it would be desirable to provide the camera user with a capability to record further information in relation to the filmstrip image frames that provides the qualities necessary to reliably track the MOF layer tracks without causing damage to the MOF layer or the emulsion layers and is relatively inexpensive and reliable.

A need therefore exists tier a less expensive and useful manner of recording and reproducing information in and from such MOF layer tracks than utilizing the precision arrays of magnetic heads employed in the camera. A challenge is created in fulfilling such a need due to the large variation of cross-film curvature encountered in filmstrips.

SUMMARY OF THE INVENTION

It is therefore an object of the present invention to provide a simplified system particularly for use by consumers for recording information as data in tracks of the MOF layer of filmstrip image frames of a processed filmstrip and outside of the limitations of a camera.

These and other objects of the invention are realized in a method and apparatus for recording and/or reproducing sets of photographic data by means of a magnetic head into a plurality of parallel data tracks extending lengthwise of a magnetic layer on a photographic filmstrip, wherein the filmstrip exhibits a lengthwise curvature of a predetermined sign and a cross-film curl when unrestrained, the method and apparatus comprising the steps of and means for: guiding the filmstrip in a curved transport path in the length dimension of the filmstrip, the curved transport path having a curvature radius of the same sign as the predetermined curvature sign of the filmstrip such that the cross-film curvature is diminished; translating the magnetic head across the guided filmstrip to a selected track across the width of the filmstrip; effecting relative lengthwise translational movement of the filmstrip and the magnetic head along the selected track; and energizing the magnetic head to record or reproduce data in the selected track during the relative lengthwise translation thereof.

The filmstrip is contained within a film cartridge and typically exhibits a lengthwise curvature of a predetermined sign. Preferably, the supporting step and means further comprises the steps of and means for: advancing the filmstrip from the film cartridge into a stationary position in a film transport path; and supporting the filmstrip in the stationary position in a curved transport path in the length dimension of the filmstrip, the curved transport path having a curvature radius of the same sign as the predetermined curvature sign of the filmstrip.

Preferably, the lengthwise translating step and means further comprises the steps of and means for: supporting the magnetic head for movement in the curvature radius for lengthwise translation with respect to the selected track; and moving the magnetic head in the curvature radius to thereby translate the magnetic head lengthwise with respect to the track.

Preferably the method and apparatus further comprises the step of and means for locating an image frame of the filmstrip in the stationary position in a viewing station for viewing the image exposed therein.

Advantages of the Invention

In accordance with the present invention, a portable, simplified and less expensive system is provided to translate a single magnetic head through the tracks of the MOF layer of the filmstrip outside of the context or a camera particularly for use with a personal computer for recording (and optionally reproducing) information in the tracks. Therefore a consumer can enhance the recording (and reproducing) capabilities desired in filmstrips that have been processed. The inventive system is especially suited for recording at high track density with the single magnetic head in the magnetic recording or reproduce drive which controls the motion of the filmstrip and the magnetic head, while allowing visual observation of the image frame.

BRIEF DESCRIPTION OF THE DRAWINGS

These and other objects, advantages and features of the present invention will be more readily understood from the following detailed description of the preferred embodiments thereof, when considered in conjunction with the drawings, in which like reference numerals indicate identical or similar components throughout the several views, and wherein.

DETAILED DESCRIPTION OF THE PREFERRED EMBODIMENTS

Figure 2:
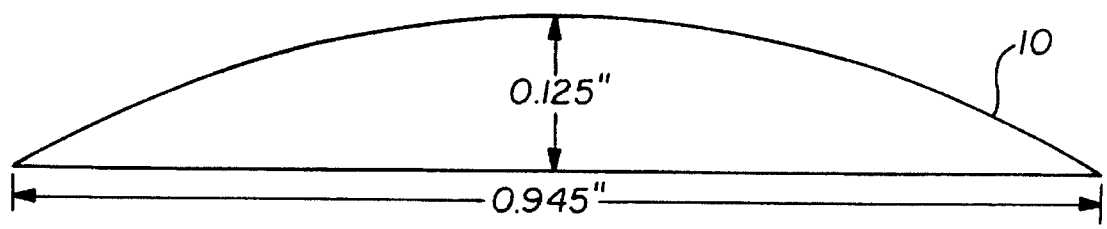
FIG. 2 is a transverse view of the filmstrip of FIG. 1 showing a typical cross-film curvature when the filmstrip is relaxed.

The magnetic head translation system of the present invention for recording and/or reproducing information from tracks in the image frame area of a stationary filmstrip image frame is shown in FIGS. 4–9. As described above, FIG. 2 shows a transverse profile of a filmstrip 10 removed from a film cassette. The filmstrip 10 is highly cross-curved; the degree of cross-curvature depends on time of storage and, in particular, humidity. Such cross-film curvature is not suitable to record on, and the filmstrip 10 must be flattened in the cross-film direction.

The cross-film curvature must also be overcome during image exposure in the image frames of the filmstrip 10. In a camera, it is therefore necessary to flatten the filmstrip 10 in the image frame area as flat as possible with a camera rail and platen system to effect the exposure of the image frame. Linear head arrays are designed to operate with the existing flattening system.

In accordance with one aspect of the present invention, advantage is taken of a further characteristic of the filmstrip to avoid using a camera rail and platen system, and particularly to avoid any backing support or pressure applied to the filmstrip emulsion layers in the image frame region.

Figure 3:
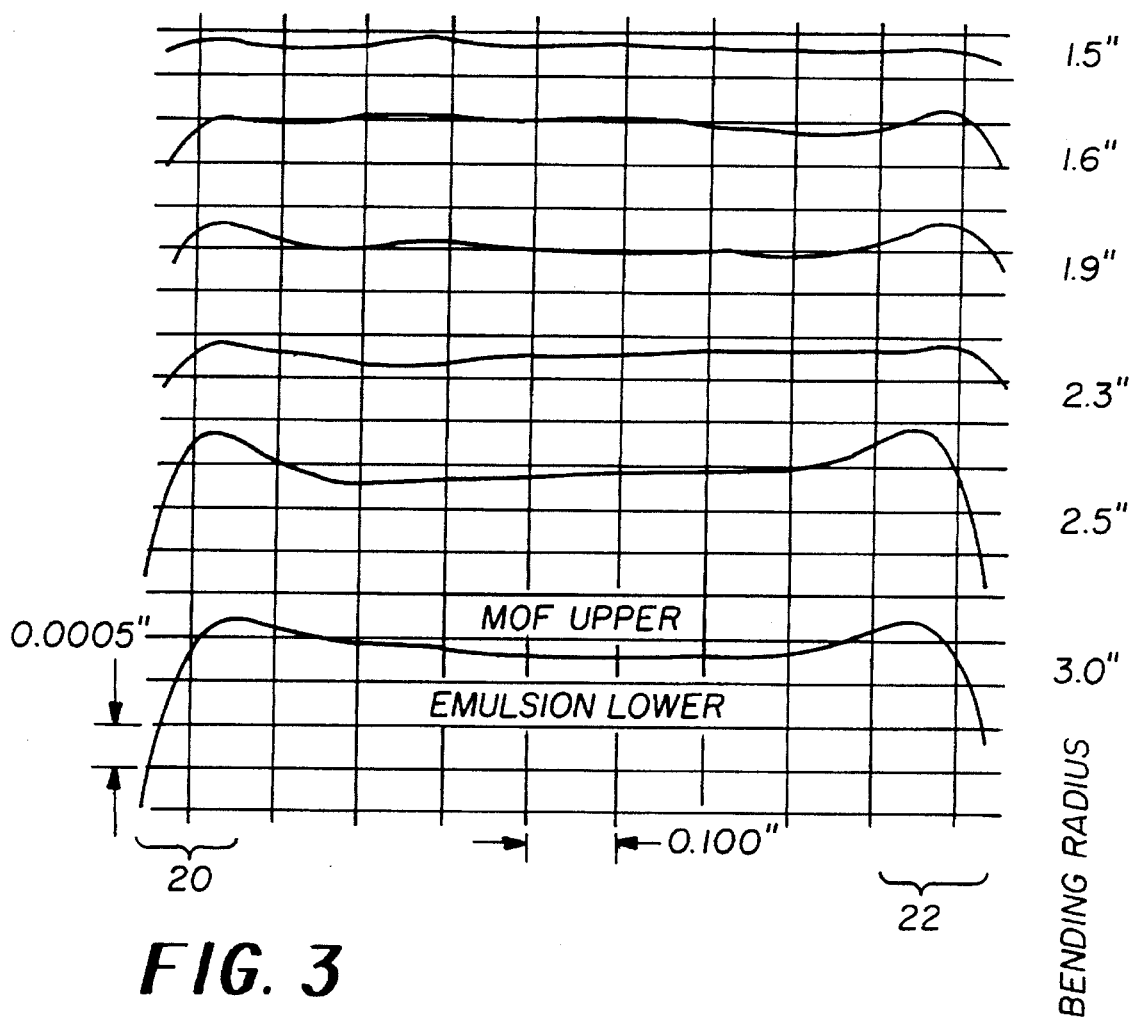
FIG. 3 is a series of tracings of the cross-film curvature observed when a filmstrip of FIG. 1 is bent around cylinders of differing bending radii.

First of all, when the filmstrip 10 is straightened in the longitudinal direction in an attempt to straighten the cross-film curvature, severe planar distortion takes place such that large ears 20, 22 are formed on the edges of the filmstrip 10. But, by bending the filmstrip in its longitudinal direction into its curvature, the cross-film curvature begins to reduce. FIG. 3 shows transverse filmstrip profiles at a 3", 2.5", 2.3", 1.9", 1.6", and 1.5" radii, with the emulsion layers 13 inside the curvature. The transverse profile becomes flatter in its center region with small ears at the edges as the radius is reduced. The flatness region is preferable to use for recording, since it is possible to conform a penetrating or prolate ellipsoid contour, magnetic head in this region without having a head-to-recording-surface compliance roll problem. However, in the context of the present invention, larger radii are preferred to enable access to the image area and also for visual inspection of the curved image. This requirement conflicts with the choice of radius for the highest potential linear transverse region. Accordingly, a compromise choice of a 2" radius which gives a region about 0.55" wide available for recording is preferred.

Figures 4, 5:
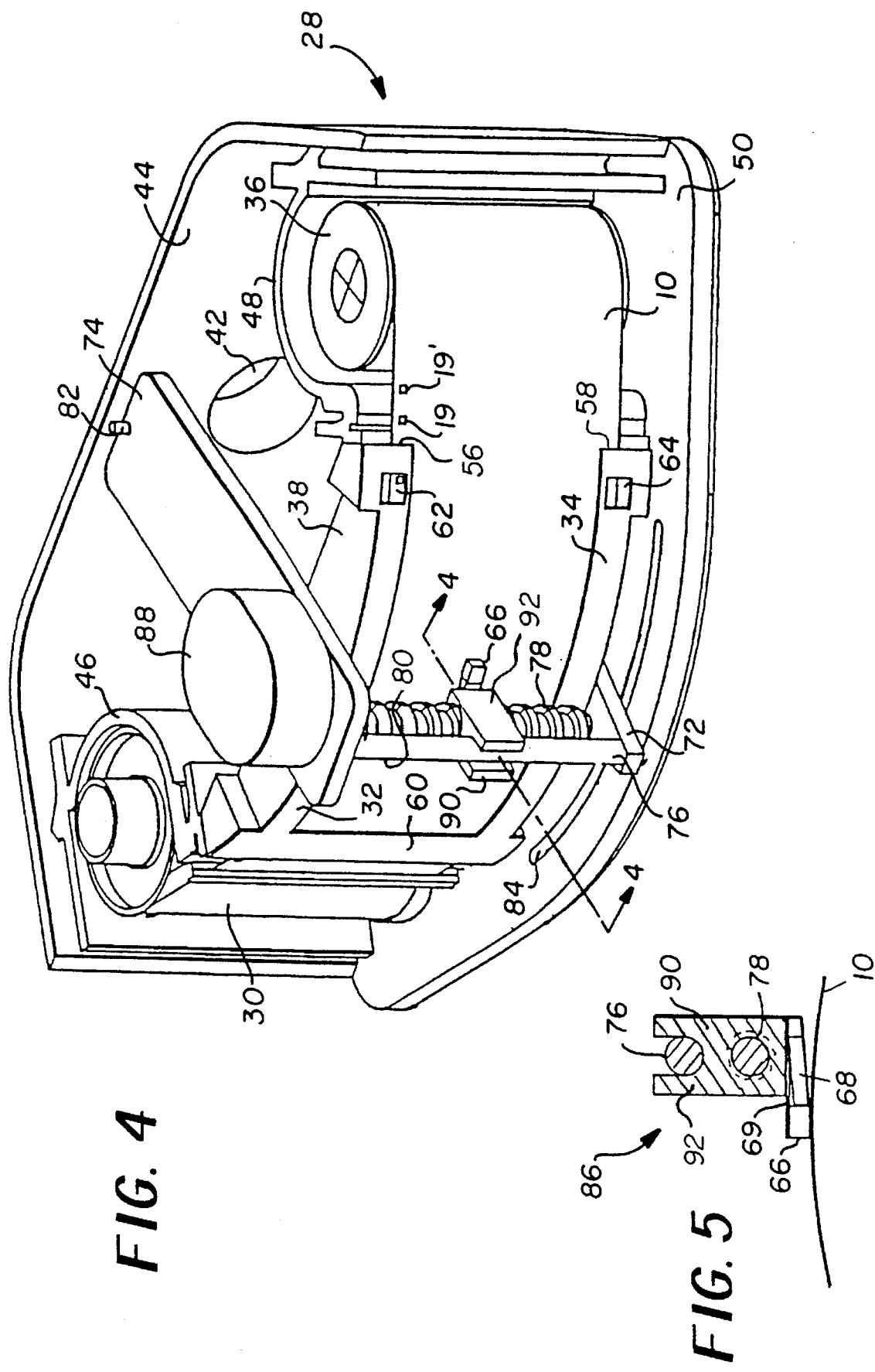
FIG. 4 is a perspective view of the interior components of a magnetic head translation system of the present invention for recording and/or reproducing information from tracks in the image frame area of a stationary filmstrip image frame.
FIG. 5 is a cross-section view of the magnetic head and transverse head drive components of FIG. 4 taken along lines 4—4.
Figure 6:
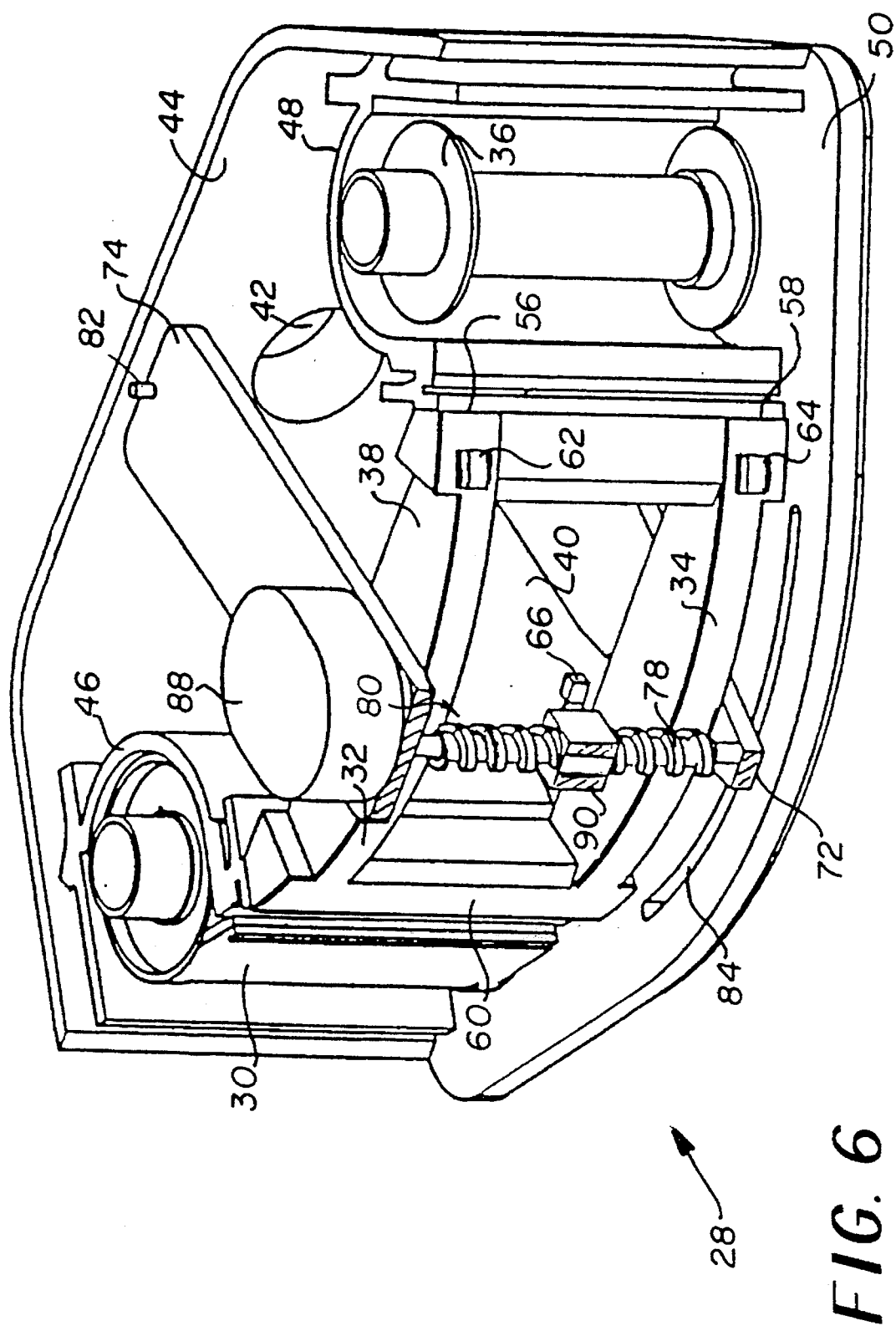
FIG. 6 is a perspective view of the system of FIG. 5 with the filmstrip and transverse guide rod removed.
Figure 7:
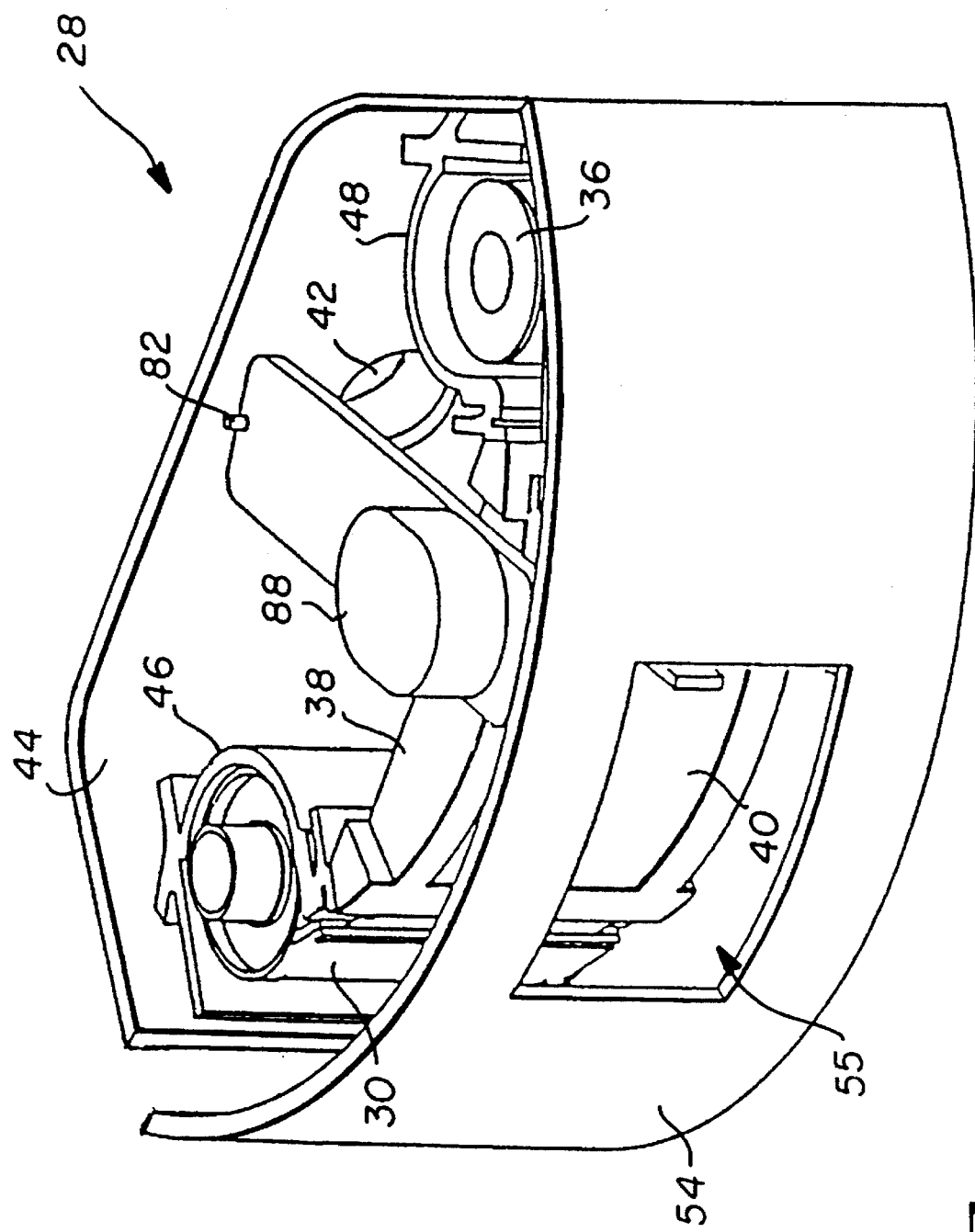
FIG. 7 is a perspective view of the system of FIG. 4 enclosed in an outer case.

Turning to FIG. 4, the interior, filmstrip guiding components of a magnetic head translation system 28 of the present invention for recording and/or reproducing information from tracks in the image frame area of a stationary filmstrip image frame are depicted. The filmstrip 10 is extended from a filmstrip cartridge 30 over filmstrip edge guides 32 and 34 and onto a take-up spool 36. The filmstrip edge guides 32, 34 are formed as pan of an inwardly extending guide block 38 and are curved to conform with the 2" radius. The guide block 38 frames an open viewing window 40 which is aligned with a lens assembly 42 in the front outer wall 44. The front outer wall 44 is joined to cylindrical housings 46 and 48 for the filmstrip cartridge 30 and the take-up spool 36, respectively. A bottom cover 50 is shown in FIG. 4, while the top cover 52 shown in FIG. 9 and the back cover 54 shown in FIG. 7 are removed from the remaining figures for ease of viewing the interior components. The filmstrip guiding components are similar to those used in a camera, except for the curved filmstrip path and the absence of rails and a platen.

In addition, the filmstrip edges including the ears 20, 22 are enclosed within channels 56 and 58. The depth of the channels 56, 58 holding the filmstrip edges must be greater than the ear 20, 22 width, and the minimum channel width must allow for the film thickness plus the ear height. In an example with 24 mm wide film, the channel width may be 0.150" and the channel height may be 0.007". Channels 56 and 58 are connected together by a bridge 60 near the filmstrip cartridge housing 46.

The filmstrip 10, when it exits the filmstrip cartridge 30, is highly cross-film and longitudinally curved, making its geometry unsuitable for magnetic recording. However, but by arcing its path in the 2.00" radius with the emulsion layers 13 inward, the cross-film curvature is drastically reduced and most of the cross-film curvature is confined to the ears 20, 22. Experimental results showing this effect are depicted in FIG. 3 as described above.

The filmstrip 10 can be moved an image frame at a time from the cartridge 30 to the take-up spool 36 by a filmstrip motor drive (not shown). In this particular embodiment, the filmstrip image frames are separated by leading and trailing perforations 19, 19'. Perforation detector windows 62 and 64 are formed in the edge channels 56 and 58, respectively, for use with perforation opto-sensors or simpler contact sensors (not shown). The image frames may be centered in the viewing window 40 by suitable sensor detect circuitry in a manner well known in automatic motorized filmstrip advance systems for cameras. Once centered, the user can view the subject of the image frame in order to recognize the image for composing notes to be recorded in the adjacent MOF layer tracks. As shown in FIG. 7, an opening 55 in the partially opened back cover 54 allows light to pass through the adjacent, unbacked, filmstrip image frame. An illuminated image frame can be viewed through the viewing lens assembly 42 in the front wall 44. This feature is especially useful for color reversal film, but negative filmstrip image frames may also be identified in this manner.

When the filmstrip 10 is threaded beneath the bridge 60 and through the edge supporting channels 56, 58, the leading end of the filmstrip 10 is guided under a magnetic head 66 by a shoe 68 that prevents collision of the filmstrip leading end with the magnetic head 66. The filmstrip is then taken up by the take-up spool 36 and is moved to place a specific image frame in the center of the curved region employing the perforation sensor controlled system.

Figure 8:
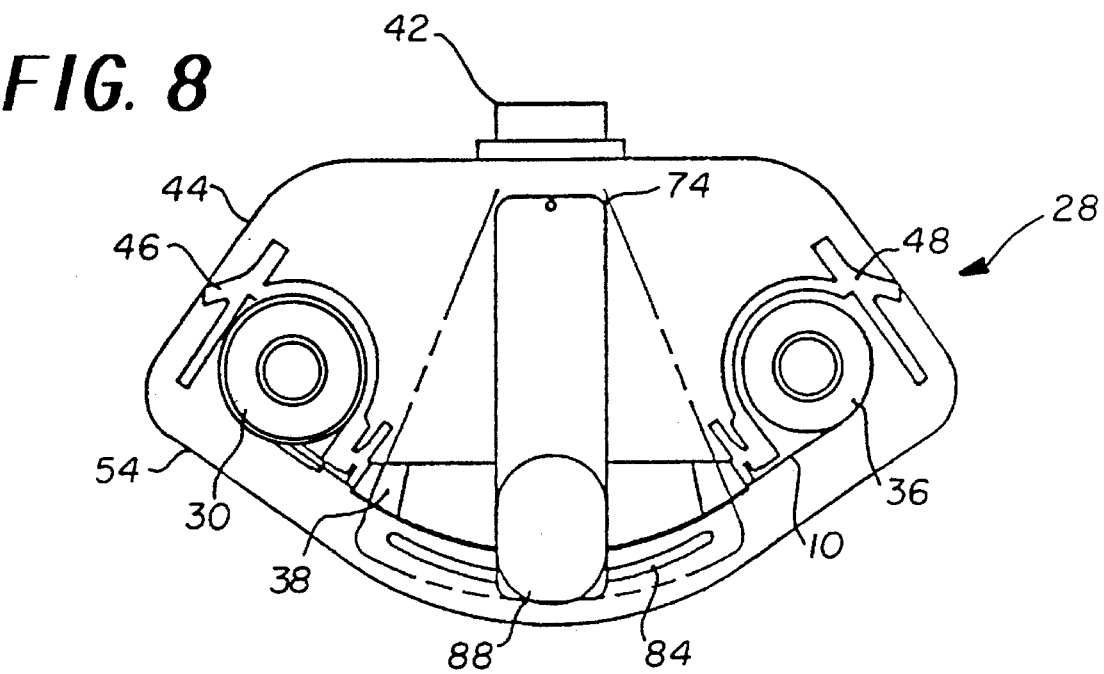
FIG. 8 is a top view of the system of FIG. 4.

Tracking accuracy can be maintained, and filmstrip cartridge systems can be made interchangeable, by defining one filmstrip edge as a guided edge in one of the edge supporting channels 56, 58 and using a spring force applied on the other filmstrip edge to contact the guiding side against the edge channel. For example, a leaf spring or springs may extend into the edge channel 56 from the underside of the guide block 38 (FIG. 8).

After threading the filmstrip in this manner, the magnetic head 66 is now in penetration contact with the antistatic and lubricating layer 17 overlying the magnetic layer 17 of the filmstrip 10. The magnetic head 66 is positioned at the end of a leaf spring 69 so that the force on the magnetic head 66 is proportional to its penetration into and deflection of the filmstrip 10. Alternatively, the magnetic head 66 can be rigidly fixed to the shoe 68, such that the contact force is provided by the deformation of the film by the penetrating head. Due to the curved path that it is constrained in, the filmstrip 10 is stiff, but deflects elastically to the penetration of the magnetic head 66. In this manner, spring loading of the magnetic head 66 onto the filmstrip 10 is achieved without the use of a backing support against the emulsion layers 13. Further filmstrip tension, or tension control, is not required, and a robust head-to-MOF layer interface results.

The surface of the magnetic head 66 deflecting the filmstrip 10 is shaped to present a prolate ellipsoid contour at the head-to-MOF layer interface which allows for penetration into the filmstrip plane and sliding motion against the filmstrip anti-static and lubricating layer 17 without causing sliding damage. The prolate ellipsoid contour may be effected by machining or lapping the head surface.

Figure 1:
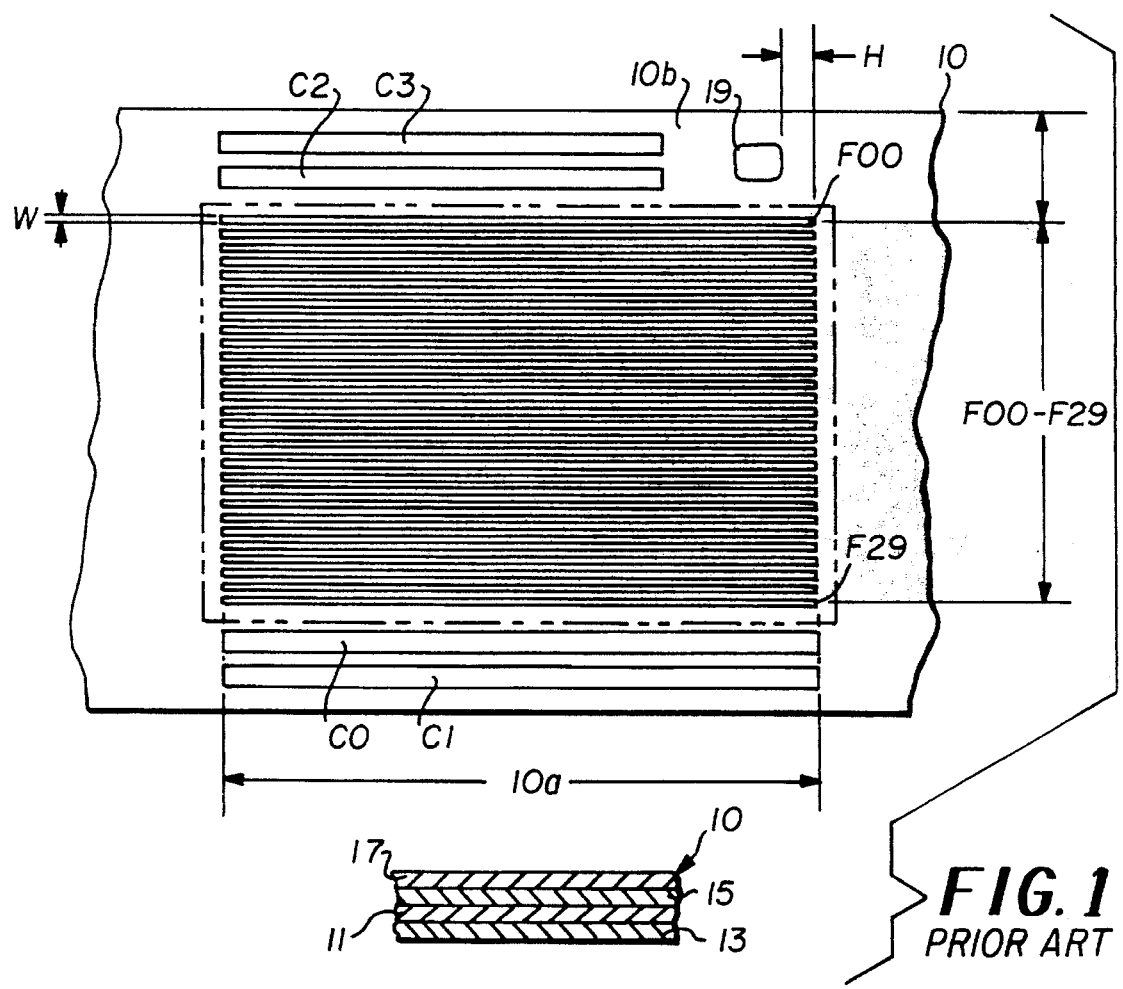
FIG. 1 is a diagram illustrating the parallel dedicated tracks in a virtually transparent MOF layer in a preferred format of the prior art for a filmstrip especially for use in cameras having a magnetic film read/write capability.

Returning to FIG. 1, the magnetic head 66 is dimensioned to the width W of the tracks F00–F29. Preferably, the magnetic head 66 is a combined read head and write head, preferably, but not necessarily, of the thin-film type for recording and the magnetoresistive type for reading. This provides a wider write head than the read head for better tracking in the tracks F00–F29.

Oscillating motion of the magnetic head 66 along the lengths of tracks F00–F29 is effected by a positioning arm motor 70 (shown at the base of bottom cover 50 in FIG. 9) cooperating with a head translation assembly 80 supporting the magnetic head 66 for translation back and forth along the length of tracks F00–F29 while filmstrip 10 is held stationary in the head tracking region. The head translation assembly 80 includes the lower and upper positioning arms 72 and 74, respectively, the transverse guide rod 76 and the lead screw 78. The free end of the lower positioning arm 72 (visible in FIG. 6) is coupled to the free end of the upper positioning arm 74 through the transverse guide rod 76 and lead screw 78. One attached end of the lower positioning arm 72 is attached to the positioning arm motor 70 for rotation thereby. An axle pin 82 extending upward from the comparable attached end of the upper positioning arm 74 fits into a bearing hole (not shown) in the interior surface of top cover 52. The range of oscillatory motion of the head translation assembly along the lengths of the tracks F00–F29 is limited by a guide track 84 in the interior surface of the bottom cover 50 which traps a limit pin (not shown) extending downward from the lower surface of the lower positioning arm 72 into it. When energized, the positioning arm motor 70 oscillates the lower positioning arm 72 longitudinally along the length of the filmstrip image frame and the tracks F00–F29. The range of motion is depicted in FIG. 8. The longitudinal translation of the magnetic head 66 during recording and/or reading can be in either direction.

Track-to-track transverse movement of the magnetic head 66 is effected through the head track selection assembly 86 which includes the head track stepper motor 88 and the head mounting block 90 shown best in FIGS. 4 and 5. The mounting block 90 includes a threaded bore that is threaded onto the lead screw 78 and a U-shaped extension 92 that is fitted around the transverse guide rod 76. The head mounting block 90 supports the shoe 68 and leaf spring 69 attached to the magnetic head 66. It will be understood that the head 66 is energized through fine wire conductors which extend to the head mounting block 90, and that flexible conductors extend from the head mounting block 90 to one or the other of the upper and lower positioning arms 72, 74 and from there to an electronic control module 100 as described below in reference to FIG. 10.

Figure 9:
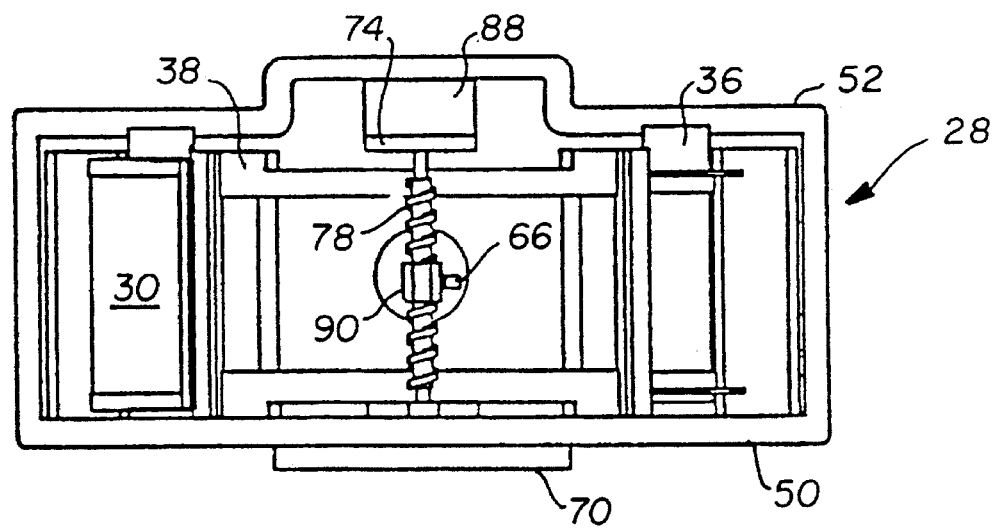
FIG. 9 is a rear elevation view of the system of FIG. 8 with the filmstrip and transverse guide rod removed.

The transverse movement of the magnetic head 66 from track to track is effected by the head track stepper motor 88 that rotates the lead screw 78 to move the head mounting block along the transverse guide rod 76 and lead screw 78 or up or down as shown in the figures. The head stepper motor 88 fits within the bulge in the top cover 52 as shown in FIGS. 8 and 9. It will be understood that the stepper motor wiring also extends along the upper positioning arm 74 to a suitable point where flexible conductors bridge the gap between the upper positioning arm 74 to the electronic module 100.

The head stepper motor 88 is operated to align the magnetic head 66 to a particular track when the filmstrip image frame is centered in the recording area and viewing window 40. The magnetic head translation system 28 then provides relative motion between the magnetic head 66 and the selected filmstrip track F00–F29, while the filmstrip 10 is stationary, to effect recording and/or reading of data in the track that the magnetic head 66 is centered on. The head stepper motor 88 may also be used, if necessary, for track following purposes during the longitudinal, oscillatory motion of the magnetic head 66 during recording or reading in a selected track.

Figure 10:
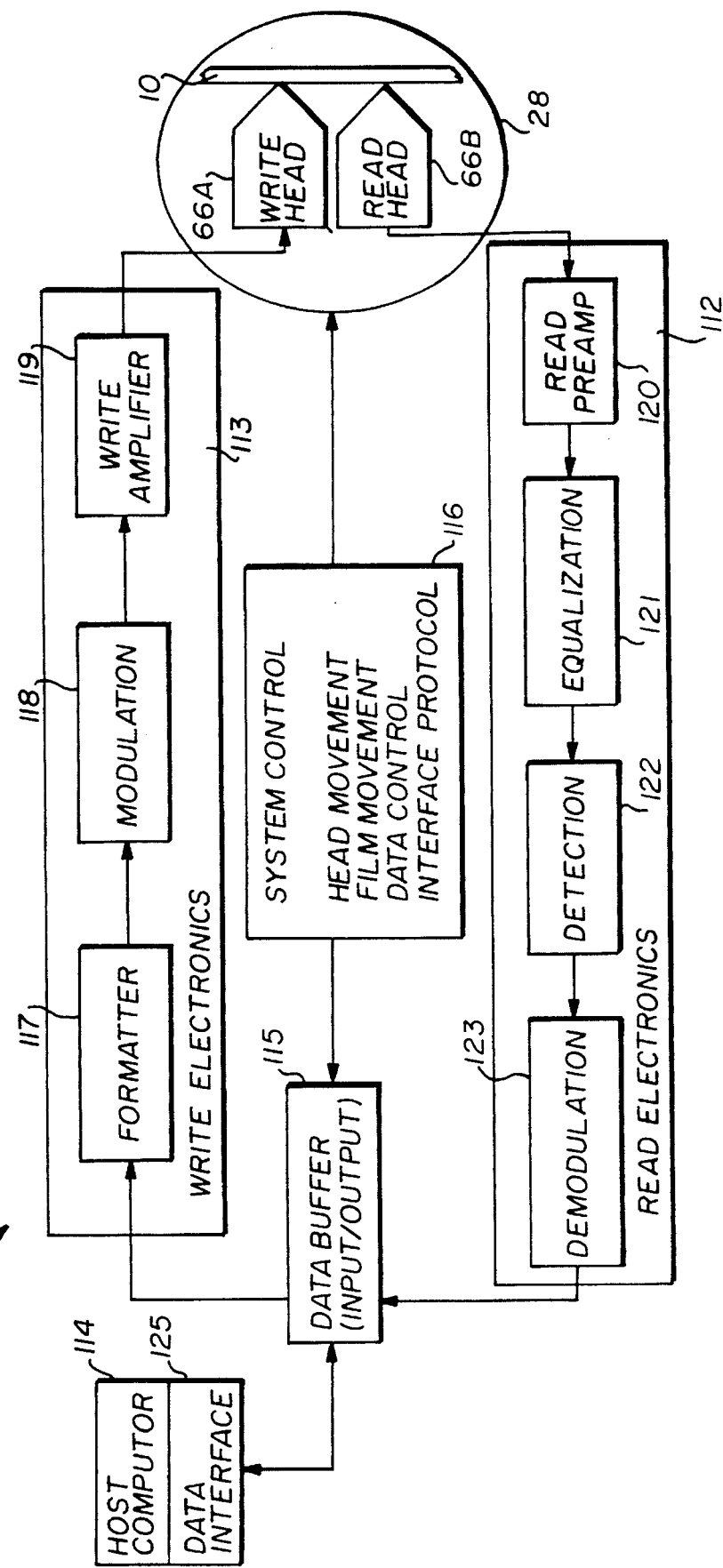
FIG. 10 is a block diagram of an electronic module for interfacing the magnetic head translation system of FIGS. 4–9 with a host computer.

It is envisioned that an electronic control and record/reproduce module 100, shown in FIG. 10, of the magnetic head translation system 28 would readily attach to a common computer workstation or personal computer or host computer 114. The magnetic head translation system 28 is shown in FIG. 10 having separate magnetic read and write heads 66A and 66B which are electrically connected to read and write electronic circuits 112 and 113, respectively. To form a properly working connection with a host computer 114, a data buffer 115 is required to regulate the flow of data and perform any of the necessary signal protocols for interfacing with standard computer input/out connections or data interface 125. In order to coordinate the mechanical movements of the filmstrip 10, the head tracking assembly 80 and the head track selection assembly 86 with the data flow requirements of the host computer 114, a system control 116 is used. System control 116 may be dedicated logic hardware or it may be a microprocessor or microcontroller having firmware instructions to respond to input signals including the perforation sensor signals and to execute control signals in a timely fashion. The control signals include the direction and drive signals to the positioning arm motor 70 and the head track stepper motor 88 as well as the cartridge 30 and spool 36 drive motor(s). An interface protocol is effected and the data flow is timed by system control 116.

The write electronic circuit 113 includes, at least, a formatter 117 which interposes data symbols in the recorded data stream that locate and synchronize data for the playback process, a modulator 118 that encodes the data stream so that most effective use is made of the media, and a write amplifier 119 that produces proper current levels for the inductive write head 66A. The read electronic circuit 112 contains, at least, four elements: a read preamplifier 120 that amplifies signals in the frequencies of interest from the very low levels that occur out of the read head 66B; filtering or equalization 121 to restore reproduce signal shape for detection; a detector 122; and a demodulation circuit 123 that decodes the modulated data.

A data buffer 115 interconnects the data interface 125 with the write electronic circuit 113, the read electronic circuit 112 and the system control 116. Data flow on the host computer side is a function of the electrical interface speed which is, generally, much faster than the mechanical speed of the magnetic head translation system 28. Data flow rate during recording or reading in the magnetic head translation system 28 is a function of magnetic head translation motion effected by the head tracking assembly 80 under the control of the system control 116.

As described above, the preferred embodiment of the invention employs the system for translating the magnetic head 66 longitudinally while the filmstrip 10 is stationary. In camera and photofinishing equipment, the magnetic head 66 is held stationary and the filmstrip 10 is moved. In cameras, the filmstrip 10 is subject to start/stop acceleration/deceleration artifacts that are caused by back and forth movement of the filmstrip 10 in relation to cartridge 30 and take-up spool 36. The film motion that results from the spool drive motors can be very jittery, especially in the take-up direction, and not good for recording purposes, since jitter results in loss of recording margin and limits the density of recording. In cameras, precise metering and control systems are therefore required to overcome these problems related to movement of the filmstrip and the cartridge and take-up spools. The alternative approach of causing continuous, bidirectional, motion of the filmstrip with respect to a magnetic head or head array can cause deterioration of the filmstrip edge, particularly on the perforation side, through the action of the pressurizing disks in the film cartridge.

The movement of the filmstrip 10 past the magnetic head 66 could be implemented in the practice of the present invention for recording in at least a limited number of tracks (to avoid filmstrip damage due to repeated back and forth movement into and out of the cartridge) without regard to information specific images. It is possible to record along the MOF layer tracks by translating the magnetic head 66 to the selected track position and moving the filmstrip from end-to-end of its length using cartridge and take-up spool motor drives. For example, in a filmstrip of 40 image frames and 20 tracks F0–F19 in each image frame area, it would be possible to record in a selected image frame track as the filmstrip is advanced continuously through the 40 frames. The filmstrip MOF layer is continuous and so the recording may be formatted to either take into account the detected perforations 19, 19' to effect the recording in the same track in segments or the may be formatted to be continuous and without regard to the perforations. Such recording could take place in the forward advancement of the filmstrip 10 from the cartridge 30 or in the rewind advancement of the filmstrip from the spool 36 back into the cartridge 30. The recording on successive selected tracks is accomplished by moving the magnetic head to the selected track and repeating the advancement of the film in the selected forward or rewind direction while recording.

As one precaution, it should be advised that the number of tracks recorded in this fashion may be limited due to potential damage of the filmstrip 10 by the particular cartridge design.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–10 filmstrip 10
imperforate edge region 10a
perforate edge region 10b
base 11
emulsion layers 13
virtually transparent magnetic layer 15
anti-static and lubricating layer 17
leading and trailing perforations 19, 19'
ears 20, 22
magnetic head translation system 28
filmstrip cartridge 30
filmstrip edge guides 32 and 34
take-up reel 36
inwardly extending guide block 38
open exposure window 40
lens assembly 42
front outer wall 44
cylindrical housings 46 and 48
bottom cover 50
top cover 52
back cover 54
window 55
edge channels 56 and 58
bridge 60
perforation detector windows 62 and 64
magnetic head 66
magnetic read head 66A
magnetic write head 66B
shoe 68
leaf spring 69
positioning arm motor 70
lower positioning arm 72
upper positioning arm 74
transverse guide rod 76
lead screw 78
head tracking assembly 80
axle pin 82
guide track 84
head track selection assembly 86
head track stepper motor 88
head mounting block 90
electronic module 100
read electronic circuit 112
write electronic circuit 113
host computer 114
data buffer 115
system control 116
formatter 117
modulator 118
write amplifier 119
read preamplifier 120
filtering or equalization 121
detector 122
demodulation circuit 123
data interface 125

We claim:

1. A method of recording and/or reproducing sets of photographic data by means of a magnetic head into parallel data tracks extending lengthwise of a magnetic layer on a photographic filmstrip, the method comprising the steps of:

supporting the filmstrip in a stationary position in a film transport path;

translating the magnetic head to a selected track across the width of said filmstrip;

translating the magnetic head lengthwise along the selected track;

energizing the magnetic head to record or reproduce data in the selected track during the lengthwise translation thereof;

wherein said supporting step further comprises the step of:

locating an image frame of said filmstrip in said stationary position in a viewing station for viewing the image exposed therein;

wherein said filmstrip exhibits a lengthwise curvature of a predetermined sign and said supporting step further comprises the step of:

supporting said filmstrip in said stationary position in a curved transport path in the length dimension of said filmstrip, said curved transport path having a curvature radius of the same sign as the predetermined curvature sign of the filmstrip;

wherein said step of translating the magnetic head lengthwise along the selected track further comprises the steps of:

supporting said magnetic head for movement in said curvature radius for lengthwise translation with respect to the selected track; and moving said magnetic head in said curvature radius to thereby translate said magnetic head lengthwise with respect to said track.

2. A method of recording and/or reproducing sets of photographic data by means of a magnetic head into parallel data tracks extending lengthwise of a magnetic layer on a photographic filmstrip, the method comprising the steps of:

supporting the filmstrip in a stationary position in a film transport path;

translating the magnetic head to a selected track across the width of said filmstrip;

translating the magnetic head lengthwise along the selected track;

energizing the magnetic head to record or reproduce data in the selected track during the lengthwise translation thereof; wherein said filmstrip exhibits a lengthwise curvature of a predetermined sign and said supporting step further comprises the step of:

supporting said filmstrip in said stationary position in a curved transport path in the length dimension of said filmstrip, said curved transport path having a curvature radius of the same sign as the predetermined curvature sign of the filmstrip;

wherein said step of translating the magnetic head lengthwise along the selected track further comprises the steps of:

supporting said magnetic head for movement in said curvature radius for lengthwise translation with respect to the selected track; and moving said magnetic head in said curvature radius to thereby translate said magnetic head lengthwise with respect to said track.

3. A method of recording and/or reproducing sets of photographic data by means of a magnetic head into parallel data tracks extending lengthwise of a magnetic layer on a photographic filmstrip, the method comprising the steps of:

supporting the filmstrip in a stationary position in a film transport path;

translating the magnetic head to a selected track across the width of said filmstrip;

translating the magnetic head lengthwise along the selected track;

energizing the magnetic head to record or reproduce data in the selected track during the lengthwise translation thereof;

wherein said filmstrip is contained within a film cartridge and exhibits a lengthwise curvature of a predetermined sign and said supporting step further comprises the steps of:

advancing said filmstrip from said film cartridge into said stationary position;

supporting said filmstrip in said stationary position in a curved transport path in the length dimension of said filmstrip, said curved transport path having a curvature radius of the same sign as the predetermined curvature sign of the filmstrip;

wherein said step of translating the magnetic head lengthwise along the selected track further comprises the steps of:

supporting said magnetic head for movement in said curvature radius for lengthwise translation with respect to the selected track; and moving said magnetic head in said curvature radius to thereby translate said magnetic head lengthwise with respect to said track.

4. The method of claim 3 wherein said supporting step further comprises the step of:

locating an image frame of said filmstrip in said stationary position in a viewing station for viewing the image exposed therein.

5. Apparatus for recording and/or reproducing sets of photographic data by means of a magnetic head into parallel data tracks extending lengthwise of a magnetic layer on a photographic filmstrip, the apparatus comprising:

filmstrip supporting means for supporting the filmstrip in a stationary position in a film transport path;

means for translating the magnetic head to a selected track across the width of said filmstrip;

means for translating the magnetic head lengthwise along the selected track;

means for energizing the magnetic head to record or reproduce data in the selected track during the lengthwise translation thereof;

wherein said filmstrip is contained within a film cartridge and exhibits a lengthwise curvature of a predetermined sign and said supporting means further comprises:

advancing means for advancing said filmstrip from said film cartridge into said stationary position;

filmstrip guiding means in said stationary position for guiding said filmstrip in a curved film transport path in the length dimension of said filmstrip, said curved transport path having a curvature radius of the same sign as the predetermined curvature sign of the filmstrip;

wherein said means for translating the magnetic head lengthwise along the selected track further comprises:

first means for supporting said magnetic head for movement in an arc of said curvature radius for lengthwise translation with respect to the selected track; and motor drive means for effecting movement of said first means in said arc to thereby translate said magnetic head lengthwise with respect to said track.

6. The apparatus of claim 5 wherein said supporting means further comprises:

means for locating an image frame of said filmstrip in said stationary position in a viewing station for viewing the image exposed therein.

7. The apparatus of claim 5, wherein:

said filmstrip guiding means further comprises a frame for supporting said cartridge and first and second filmstrip edge guides shaped in to conform to said curvature for engaging opposite edges of said filmstrip in said stationary position;

said means for translating the magnetic head to a selected track across the width of said filmstrip further comprises a head track selection assembly; and said first means further comprises first and second positioning arms coupled at first ends thereof to said head track selection assembly and having second ends mounted to said frame for pivotal movement conforming with said curved radius for lengthwise translation of said magnetic head with respect to the selected track of the stationary filmstrip in said filmstrip guiding means.

8. The apparatus of claim 7, wherein said head track selection assembly further comprises:

head track guide means connected between said first ends of said positioning arms for supporting said magnetic head for engagement with said filmstrip selected track; and head track motor drive means for driving said magnetic head along said head track selection assembly means to a selected track position.

9. The apparatus of claim 8 wherein:

said head track guide means further comprises a guide rod and a rotatable lead screw extending between said first ends of said positioning arms and across said film transport path; and further comprising:

head mounting means for mounting said magnetic head in relation to said film transport path having a guide opening for engaging said guide rod for inhibiting rotation of said head mounting means about said lead screw on rotation of said lead screw and having a threaded bore for engaging said lead screw, whereby rotation of said lead screw effects translation of said head mounting means along said lead screw and guide rod and across said film transport path to a selected track.

10. The apparatus of claim 9 wherein said supporting means further comprises:

means for locating an image frame of said filmstrip in said stationary position in a viewing station for viewing the image exposed therein.

\* \* \* \* \*